(12) United States Patent
Stupp et al.

(10) Patent No.: US 9,443,636 B2
(45) Date of Patent: *Sep. 13, 2016

(54) SUPRAMOLECULAR NETWORKS WITH ELECTRON TRANSFER IN TWO DIMENSIONS

(75) Inventors: Samuel I. Stupp, Chicago, IL (US); J. Fraser Stoddart, Evanston, IL (US); Alexander K. Shveyd, Rochester, NY (US); Alok S. Tayi, Niskayuna, NY (US); Chi-Hau Sue, Berkley, CA (US); Ashwin Narayanan, Chicago, IL (US)

(73) Assignee: Northwestern University, Evanston, IL (US)

( * ) Notice: Subject to any disclaimer, the term of this patent is extended or adjusted under 35 U.S.C. 154(b) by 760 days.

This patent is subject to a terminal disclaimer.

(21) Appl. No.: 13/526,215

(22) Filed: Jun. 18, 2012

(65) Prior Publication Data

US 2012/0319058 A1    Dec. 20, 2012

Related U.S. Application Data

(60) Provisional application No. 61/498,262, filed on Jun. 17, 2011.

(51) Int. Cl.
| | |
|---|---|
| *F21V 9/00* | (2015.01) |
| *G02B 5/02* | (2006.01) |
| *G02C 7/10* | (2006.01) |
| *G02F 1/361* | (2006.01) |
| *G03B 11/00* | (2006.01) |
| *H01B 1/12* | (2006.01) |
| *H01B 1/00* | (2006.01) |

(52) U.S. Cl.
CPC ................................ *H01B 1/121* (2013.01)

(58) Field of Classification Search
USPC ................................ 252/500, 582; 548/433
See application file for complete search history.

(56) References Cited

U.S. PATENT DOCUMENTS

| | | | |
|---|---|---|---|
| 4,825,408 A | 4/1989 | Potember | |
| 2013/0069010 A1* | 3/2013 | Stupp et al. | 252/500 |

FOREIGN PATENT DOCUMENTS

| | | |
|---|---|---|
| EP | 0183168 | 3/1992 |
| WO | 2010-089595 | 8/2010 |

OTHER PUBLICATIONS

Sofia I. Pascu, Thibaut Jarrosson, Christoph Naumann, Sijbren Otto, Guido Kaiser and Jeremy K. M. Sanders,Cation-reinforced donor-acceptor pseudorotaxanes, New J. CHem., 29, 80-89, 2005.*
U.S. Appl. No. 13/476,974, filed May 21, 2012, Stupp et al.
PCT Search Report from PCT/US2012/042978 issued Jan. 31, 2013.

* cited by examiner

*Primary Examiner* — Bijan Ahvazi
(74) *Attorney, Agent, or Firm* — Reinhart Boerner Van Deuren s.c.

(57) ABSTRACT

Organic charge-transfer (CT) co-crystals in a crossed stack system are disclosed. The co-crystals exhibit bidirectional charge transfer interactions where one donor molecule shares electrons with two different acceptors, one acceptor face-to-face and the other edge-to-face. The assembly and charge transfer interaction results in a pleochroic material whereby the optical absorption continuously changes depending on the polarization angle of incident light.

8 Claims, 18 Drawing Sheets

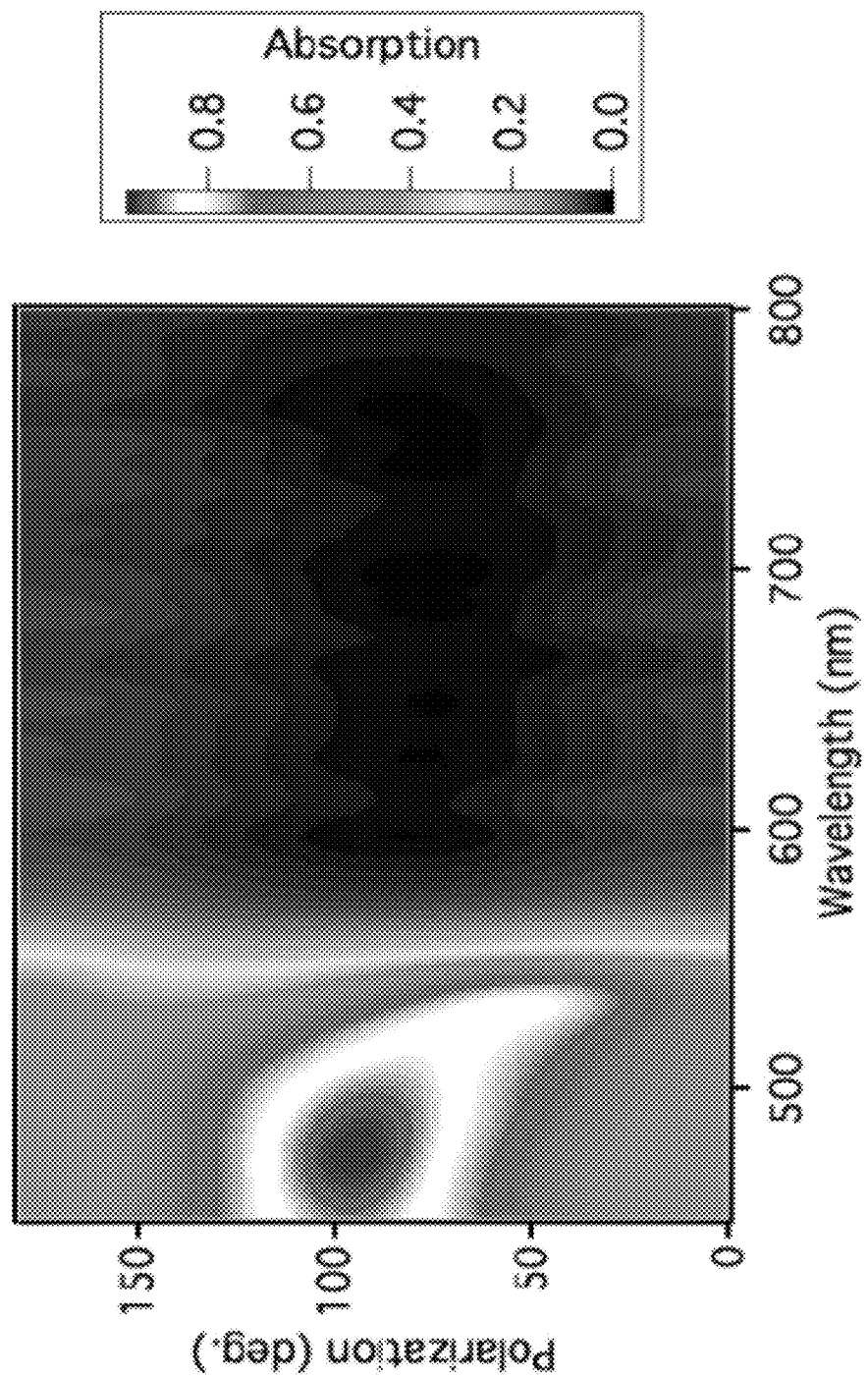

SUPRAMOLECULAR NETWORKS WITH ELECTRON TRANSFER IN TWO DIMENSIONS

This application claims priority benefit from application Ser. No. 61/498,262 filed Jun. 17, 2011—the entirety of which is incorporated herein by reference.

This invention was made with government support under number DE-SC0000989 awarded by the Department of Energy. The government has certain rights in the invention.

FIELD OF THE INVENTION

The present invention relates generally to solution-phase assembly of a 2D supramolecular network of charge transfer complexes that form an architecture called a "crossed stack" lattice. These crossed stack structures exhibit bidirectional charge transfer interactions where one donor molecule shares electrons with two different acceptors: one acceptor face-to-face and the other edge-to-face. The assembly and charge transfer interaction results in a pleochroic material whereby the optical absorption continuously changes depending on the polarization angle of incident light. Thus, these crossed stack materials can be used in various optical applications.

BACKGROUND OF THE INVENTION

The field of supramolecular chemistry has long explored the balance of non-covalent interactions like hydrogen bonding, charge transfer (CT), and $\pi$-$\pi$ stacking to develop novel functional materials. Several groups have demonstrated the assembly of molecules into functional one-dimensional ($\alpha$D) structures with biological or electronic applications (Hartgerink, J. D. et al., 2001 *Science* 294, 1684; Hartgerink, J. D. et al., 2002 *Proceedings of the National Academy of Sciences of the United States of America* 99, 5133; Silva, G. A. et al., 2004 *Science* 303, 1352; Hill, J. et al., 2004 *Science* 304, 1481 (2004); and Yamamoto, Y. et al., 2006 *Science* 314, 1761). Electron donor-acceptor complex crystals, which also form 1D assemblies, exhibit properties such as metallic conduction, ferroelectricity, and magnetism, whereby these attributes result from the electron transfer from an electron rich donor to an electron poor acceptor along one dimension (Alves, H. et al., 2008 *Nat Mater* 7, 574; Collet, E. et al., 2003 *Science* 300, 612; and Jain, R. et al., 2007 *Nature* 445, 291). Generally, organic CT complexes form a mixed stack or segregated stack lattice in which donors and acceptors assemble into face-to-face or edge-to-edge pairs, respectively. However, few purely organic molecular systems with higher dimensionality have been observed whereby electron density may be shared in orthogonal dimensions (Moody, G. J. et al., 1987 *Angew Chem Int Edit* 26, 890; and Ashton, P. R. et al., 1994 *J Chem Soc Chem Comm*, 181).

It is therefore desirable to provide a two-dimensional (2D) supramolecular network of charge transfer complexes that exhibit bidirectional charge transfer and monodomain visible pleochroism.

SUMMARY OF THE INVENTION

In light of the foregoing, it is an object of the present invention to provide organic charge-transfer (CT) co-crystals into a crossed stack system, wherein the co-crystal exhibits monodomain visible pleochroism.

Accordingly, it will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

Other objects, features, benefits and advantages of the present invention will be apparent from this summary and the following descriptions of certain embodiments, and will be readily apparent to those skilled in the art. Such objects, features, benefits and advantages will be apparent from the above as taken into conjunction with the accompanying examples, data, and all reasonable inferences to be drawn therefrom. The disclosures in this application of all articles and references, including patents, are incorporated herein by reference.

DETAILED DESCRIPTION OF THE INVENTION

Accordingly, a non-limiting embodiment of the invention is an organic charge-transfer (CT) in a crossed stack system exhibiting bidirectional charge transfer interactions where one donor molecule shares electrons with two different acceptors, wherein one acceptor is face-to-face and the other is edge-to-face, and wherein the co-crystal exhibits visible pleochroism with RGB (red, green and blue) and CMYK (cyan, magenta, yellow and key) colors. As disclosed in detail in U.S. Ser. No. 13/476,974 (filed May 21, 2012) and the references disclosed therein, the application and cited references incorporated herein in their entirety, the co-crystal consists essentially of an electron acceptor molecule (A) and an electron donor molecule (D), wherein one of A and D is an $\alpha$-complement and the other one of A and D is a $\beta$-complement, such that the $\beta$-complement is incorporated into the $\alpha$-complement through molecular linkages in a solvent system to form a co-crystalline supramolecular network, wherein one or more of the molecular linkages between $\alpha$-complement and the $\beta$-complement use adaptive intermolecular recognition to form the one or more molecular linkages.

Figure 1A:
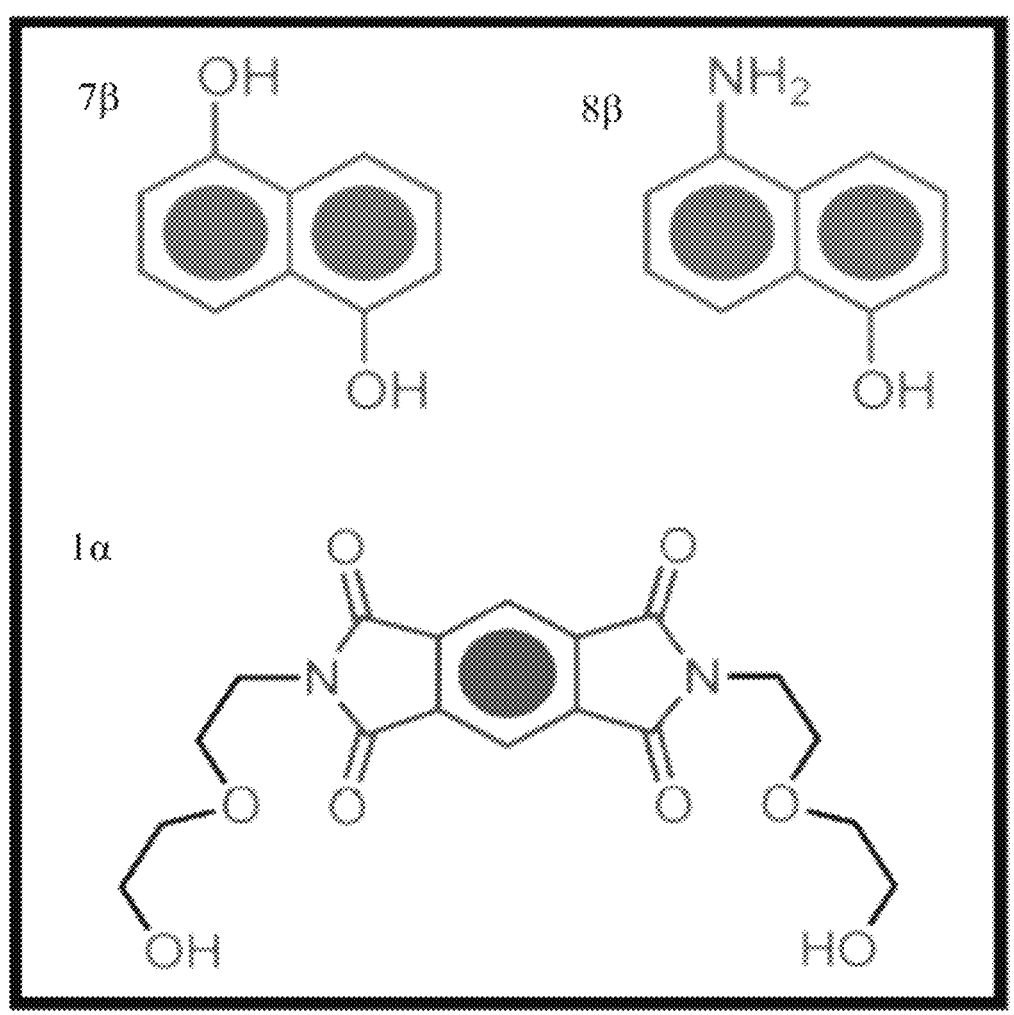
FIG. 1 depicts molecules and crystal structures of cross stacked materials as used herein; a) molecular structures of electron donor and electron acceptor components; b) co-crystal $1\alpha\bullet7\beta$; c) co-crystal $1\alpha\bullet8\beta$.
Figure 1B:
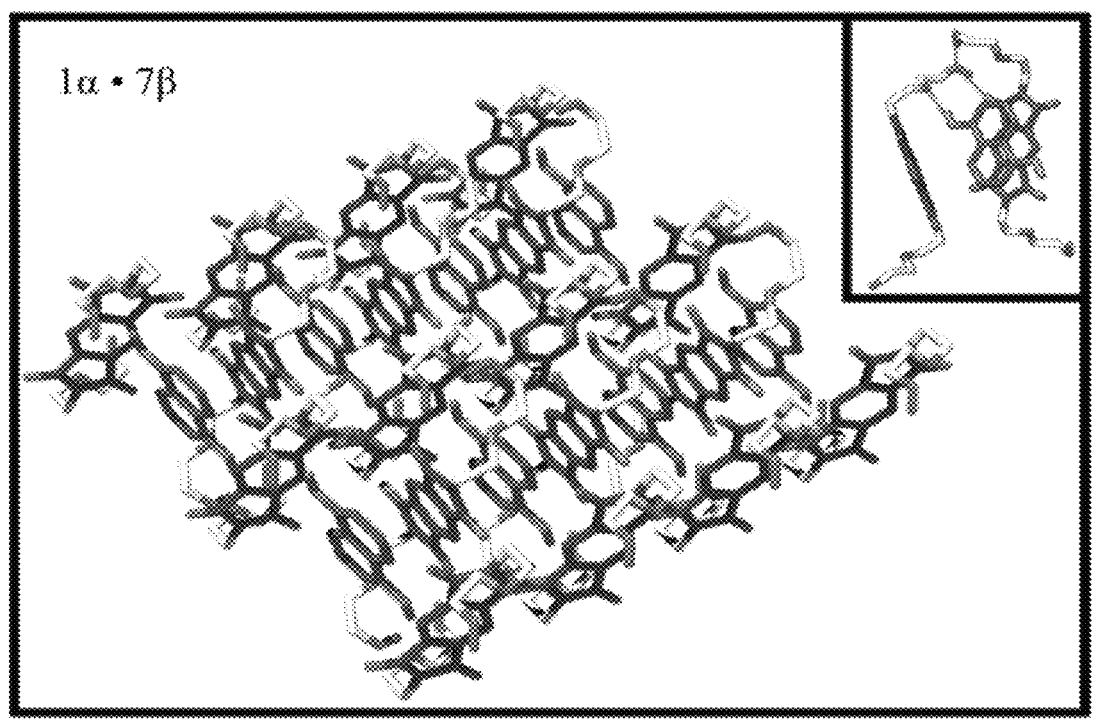
Figure 1C:
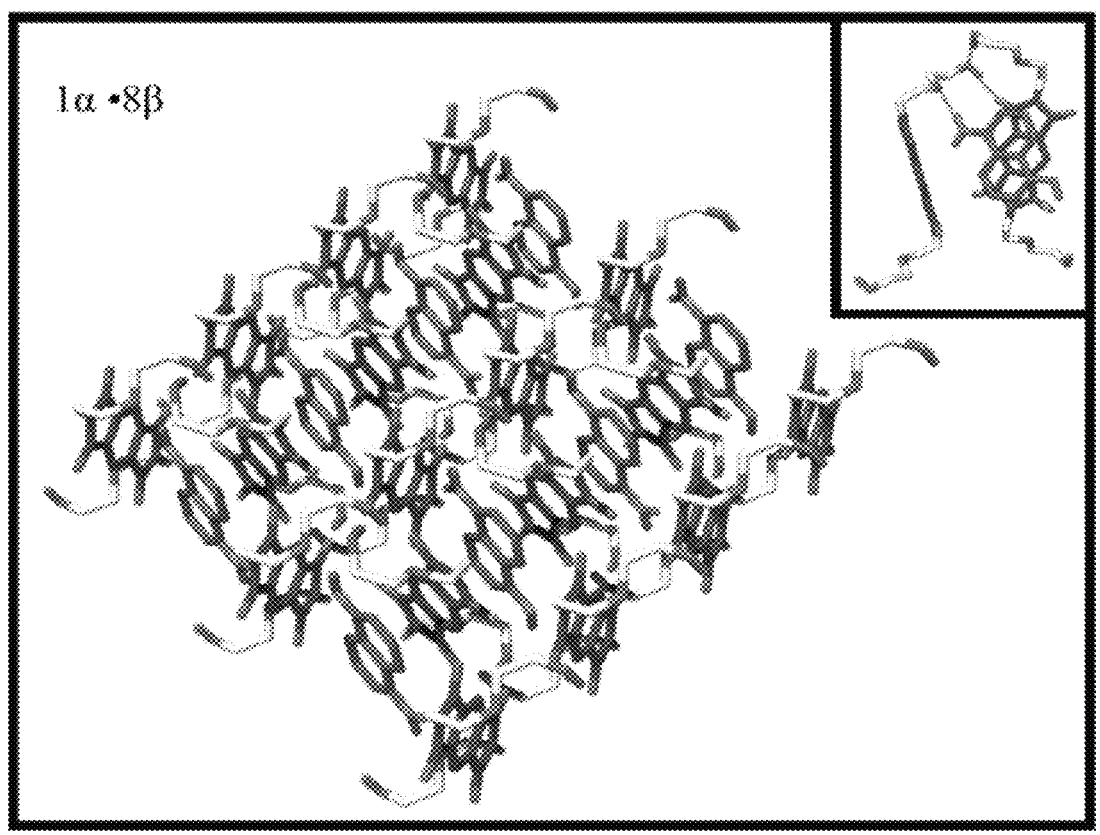

In a specific non-limiting example, the co-crystals disclosed herein (2D structures) incorporate naphthalene (7β, 8β) and pyromellitic diimide (1α) derivatives shown in FIG. 1a. CT co-crystals of compounds 1α•7β and 1α•8β (as numbered in U.S. Ser. No. 13/476,974) self-assemble from solution, without a template, using a liquid-liquid diffusion technique in ambient conditions. The structures, which appear as macroscopic flat sheets (500 μm×500 μm), are studied by X-ray crystallography (FIG. 1b and FIG. 1c) and reveal an architecture for CT pairs termed herein as a "crossed stack" lattice. Referring to FIG. 1, when co-crystallized, compounds 1α•7β (FIG. 1b) and 1α•8β (FIG. 1c) form three-dimensional supramolecular crossed stack networks with H-O distances of 1.845 nm and 1.843 nm, respectively. The atomic sites that participate in supramolecular interactions are depicted in dark and the hydrogen bonds between atoms are depicted as dark dashed lines (FIG. 1b and FIG. 1c, inset). In the case of compound 1α•8β, the position of hydroxyl and amine arms on compound 8β is disordered within the crystal. For clarity, the arms are shown to be alternating along the mixed stack.

In this assembly, donor and acceptor molecules organize face-to-face, similar to a mixed stack; however, a second acceptor is oriented edge-to-face with each donor (FIG. 1b and FIG. 1c, inset). In the crossed stack network, and as used herein, the face-to-face stacking dimension is labeled the "mixed stack axis" and the edge-to-face dimension is the "crossed stack axis." Four supramolecular forces are responsible for the formation of a crossed stack network: (i) charge transfer, (ii) π-π stacking, (iii) hydrogen bonding, and (iv) van der Waals interactions. The pyromellitic diimide acceptor (1α) is capable of hydrogen bonding with neighboring donors and acceptors through two diethylene glycol supramolecular "arms." Additionally, both symmetric (7β) and asymmetric (8β) donors are functionalized with short hydroxyl or amino arms that can hydrogen bond with neighboring acceptors. Co-crystal 1α•8β incorporates an asymmetric donor with an intramolecular dipole. In the solid-state material, this dipole is randomly oriented within the lattice resulting in network-wide dipole disorder. This molecular design, called Lock-Arm Supramolecular Ordering (LASO), utilizes noncovalent interactions to form an ordered, close packed, solvent-free network.

Figure 2A:
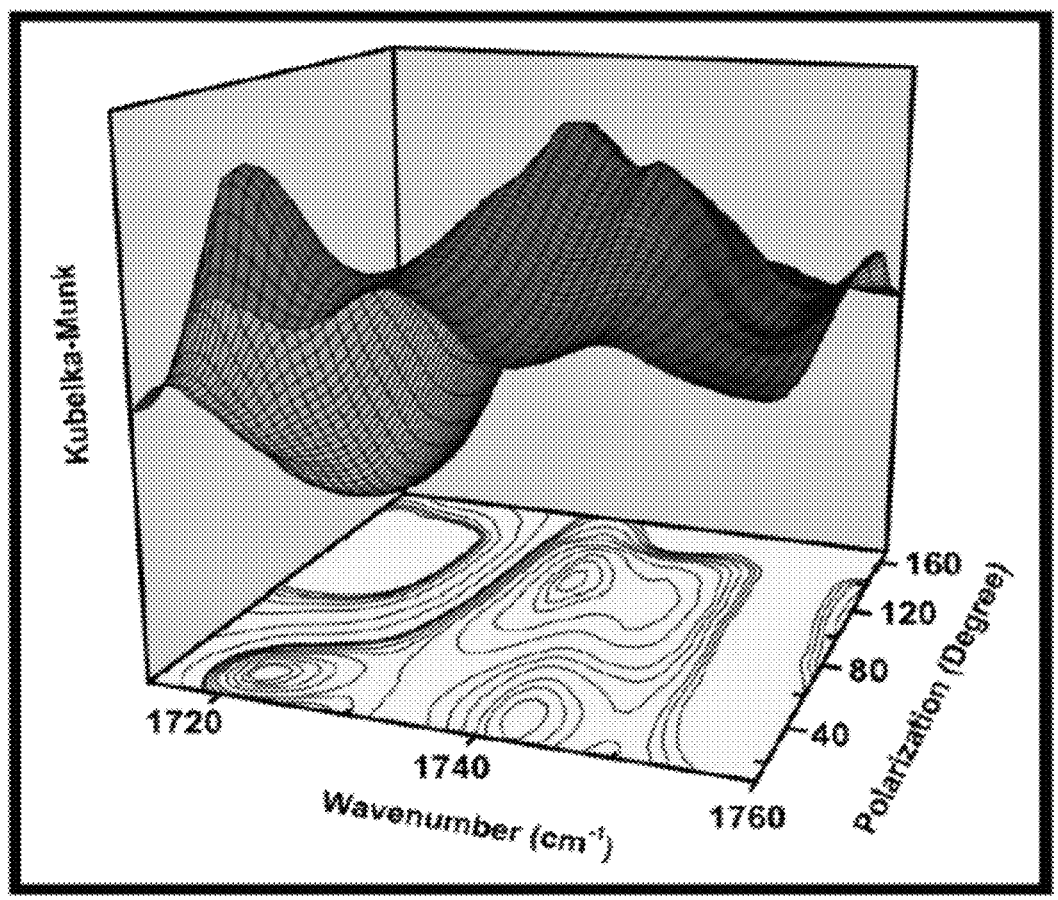
FIG. 2 provides polarized FT-IR spectrum of cross stacked a) co-crystal $1\alpha\bullet7\beta$ and b) co-crystal $1\alpha\bullet8\beta$.
Figure 2B:
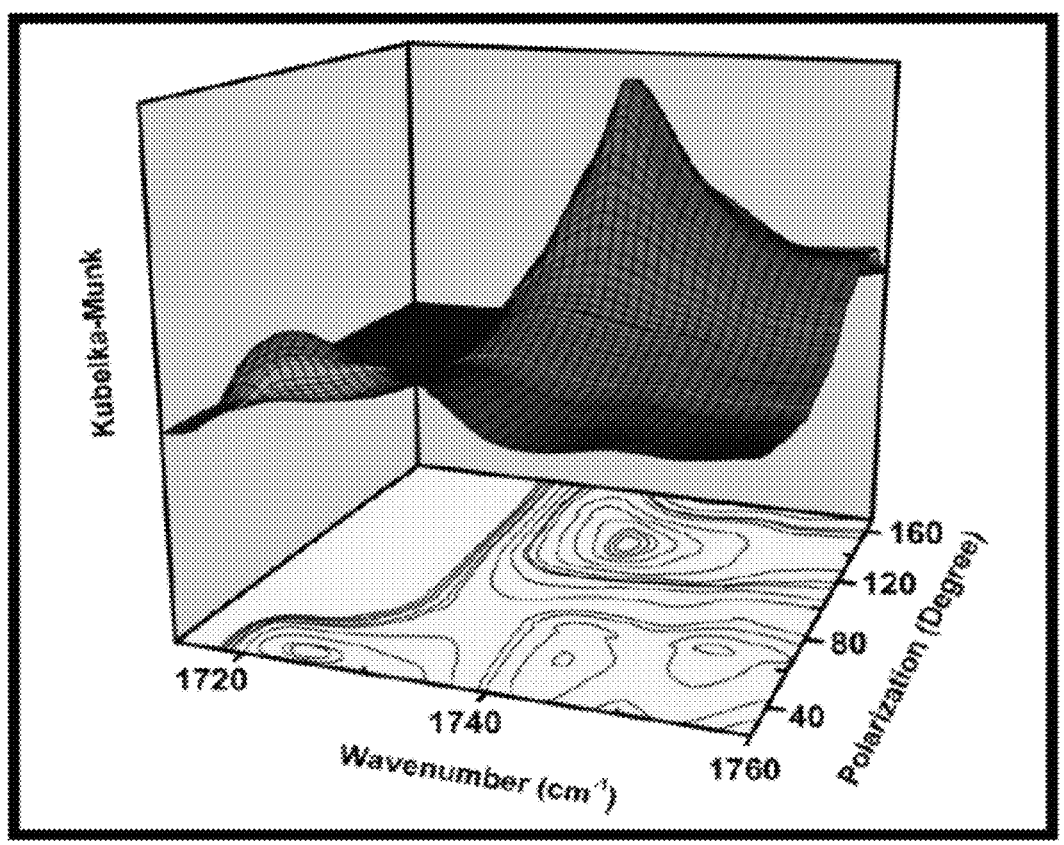

The propinquity of an electron rich donor and electron poor acceptor molecules enables ground-state electron transfer processes. Ionicity (ρ) is a measure of the amount of CT within a system (Soos, Z. G., 2007 Chem Phys Lett 440, 87, incorporated herein by reference). Here, ρ is quantified for each material by using polarized vibrational spectroscopy (FT-IR). Shifts in the ungerade modes of molecules are used to calculate ρ because they are decoupled from electron-molecular vibration interactions. A linear shift of the C=O stretch (1728-1716 $cm^{-1}$) is used to calculate ρ along an axis for each compound (FIG. 2a and FIG. 2b). Referring to FIG. 2, crossed stack materials are placed on a silicon wafer and illuminated under ambient conditions. Using polarized IR radiation, reflected light is measured to determine absorption. It is known that the carbonyl region of compound 1α absorbs between 1700 and 1800 $cm^{-1}$. The carbonyl peak shift from crossed stack materials is compared with neutral and reduced pyromellitic diimide to determine the ionicity of each LASO complex. Interestingly, both structures share electrons along the mixed stack ($ρ_{ms}$) and crossed stack ($ρ_{xs}$) axes of similar amounts. For compound 1α•7β, $ρ_{ms}$=0.53 and $ρ_{xs}$=0.47, while for compound 1α•8β, $ρ_{ms}$=0.57, $ρ_{xs}$=0.42. The anisotropy in ionicity between the orthogonal mixed stack and cross stack directions proves the two-dimensional charge transfer in the LASO system. Ionicities for the mixed stack and crossed stack axes are found to be approximately along the (1 0 0) and (0 1 0), respectively. The mixed stack and crossed stack ionicities for both compounds are at the cusp of the neutral-ionic border (ρ=0.5) and the summation of the $ρ_{ms}$ and $ρ_{xs}$ ionicities suggests that both naphthalene-based donors are nearly fully ionized (Okamoto, H. et al., 1991 Phys Rev B 43, 8224, incorporated herein by reference). As used herein, the unique CT interactions in orthogonal directions are described as bidirectional CT. Moreover, both structures violate the mutual exclusion rule of the IR and Raman modes along the mixed stack and crossed stack axes implying a non-centrosymmetric lattice. This conclusion can be drawn from spectroscopic evidence, though X-ray crystallography can be refined in both centrosymmetric and non-centrosymmetric space groups. With acceptor (1α), both symmetric (7β) and asymmetric (8β) donors form non-centrosymmetric crystalline networks that have bidirectional CT.

Figure 3A:
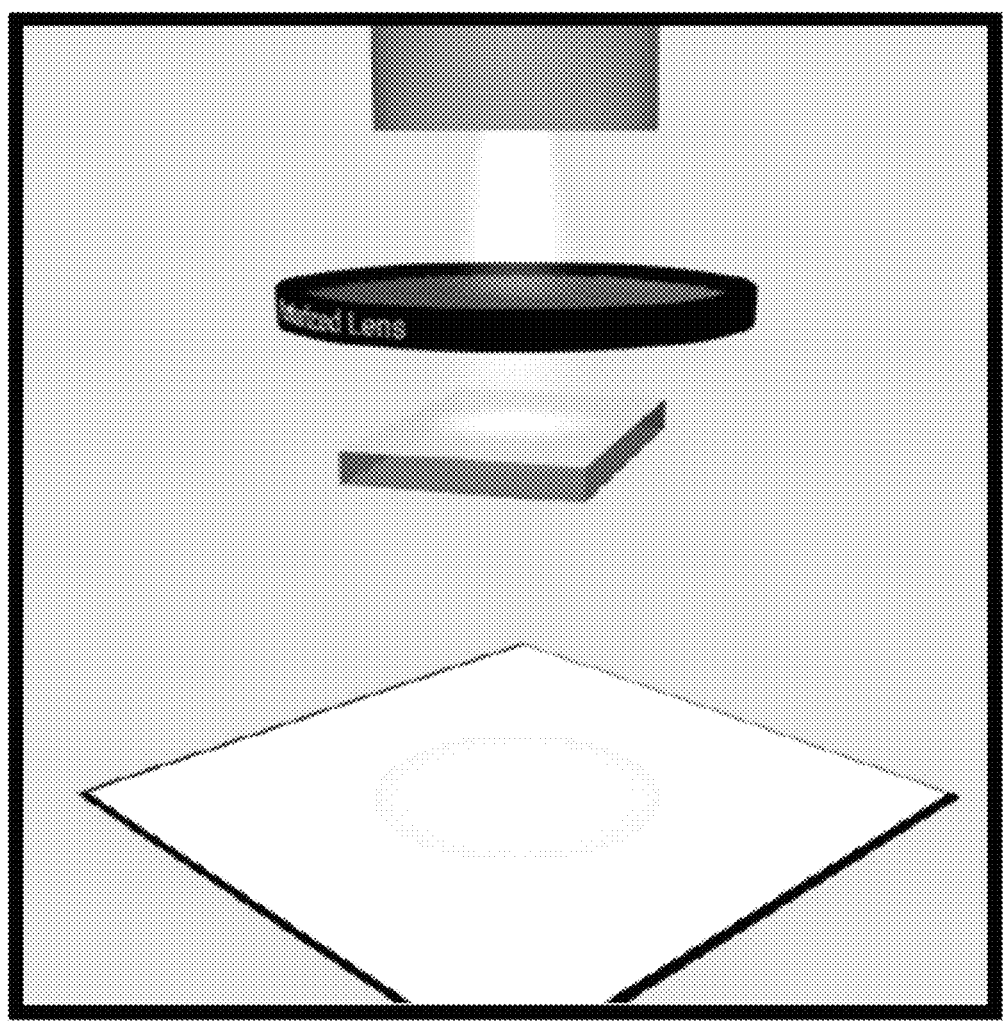
FIG. 3 shows the pleochroic behavior of crossed stack LASO materials disclosed herein; a) a petrographic microscope used to image crossed stack materials; b) single crystal of co-crystal $1\alpha\bullet7\beta$ imaged in the one-polarizer mode; e) single crystal of co-crystal $1\alpha\bullet8\beta$ imaged in the one-polarizer mode; materials imaged in c) parallel polarized mode for $1\alpha\bullet7\beta$; d) cross polarized mode for $1\alpha\bullet7\beta$; and f) parallel polarized mode for $1\alpha\bullet8\beta$ and g) cross polarized mode for $1\alpha\bullet8\beta$.
Figure 3B:
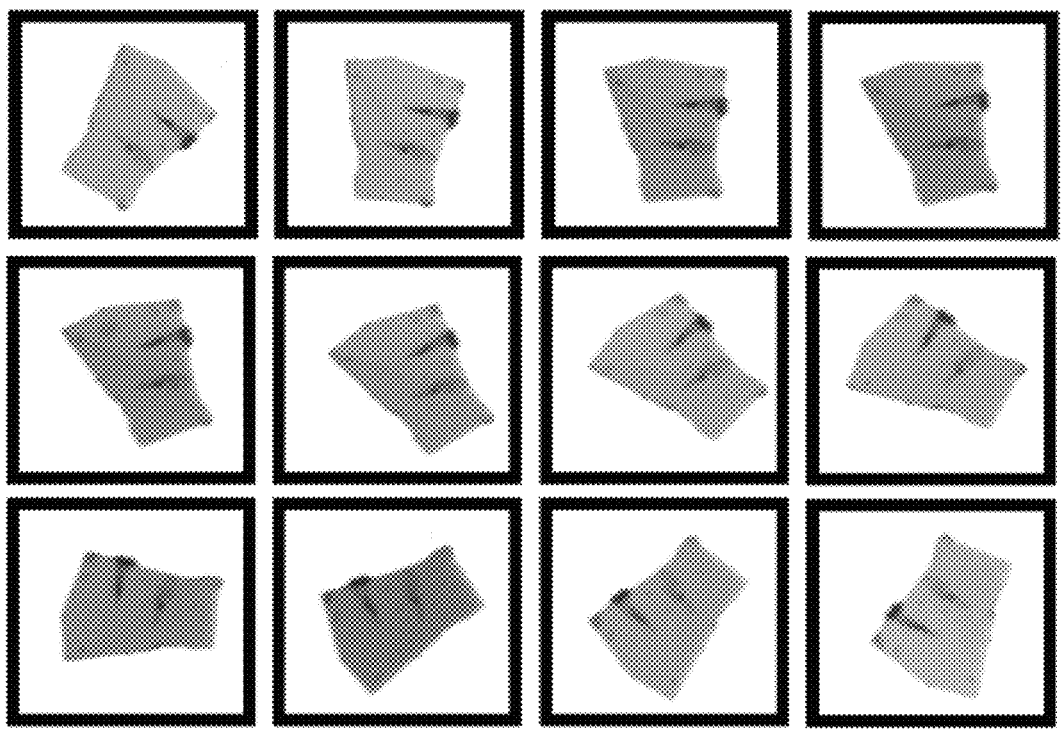
Figure 3C:
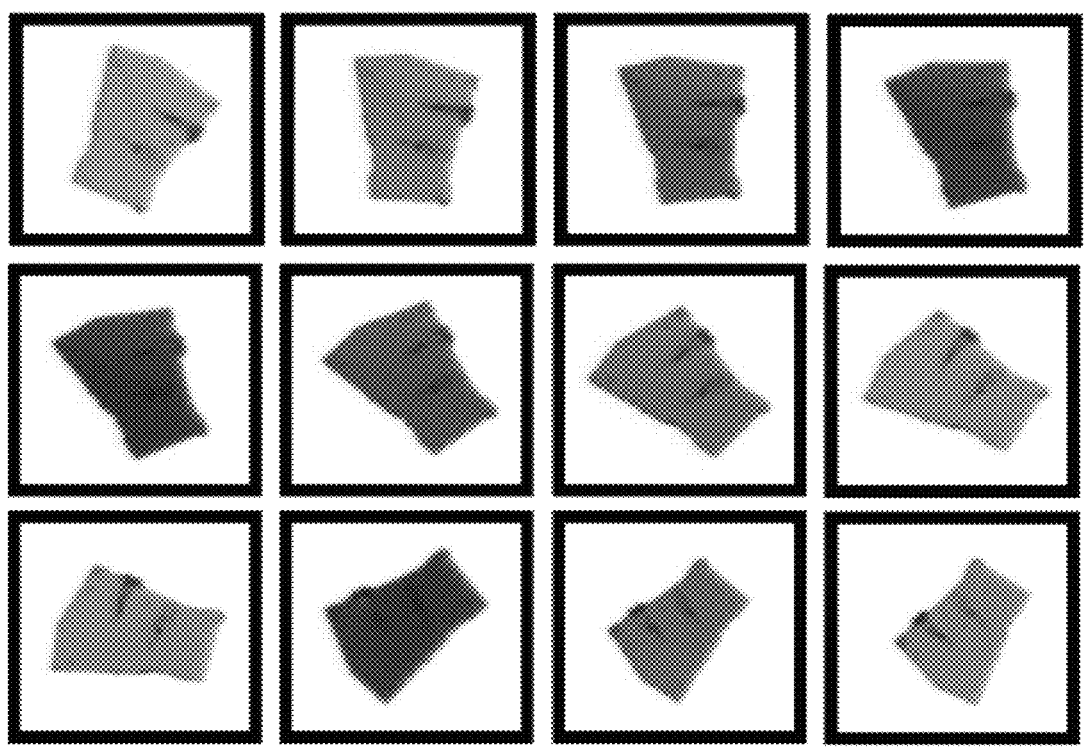
Figure 3D:
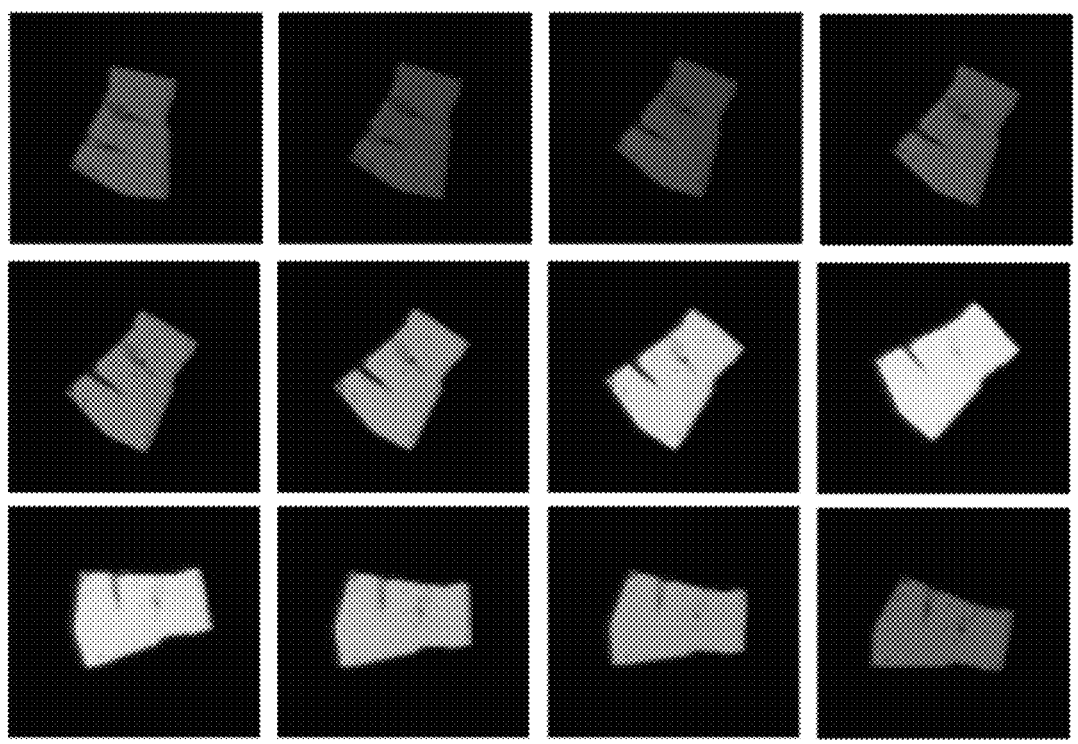
Figure 3E:
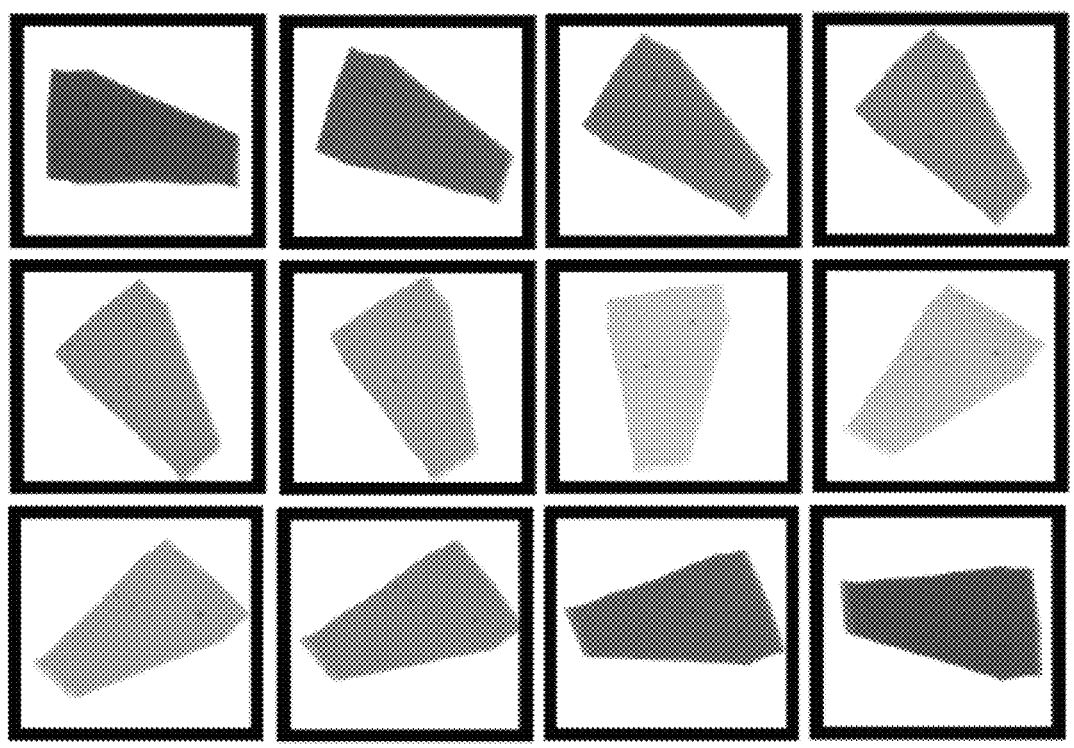
Figure 3F:
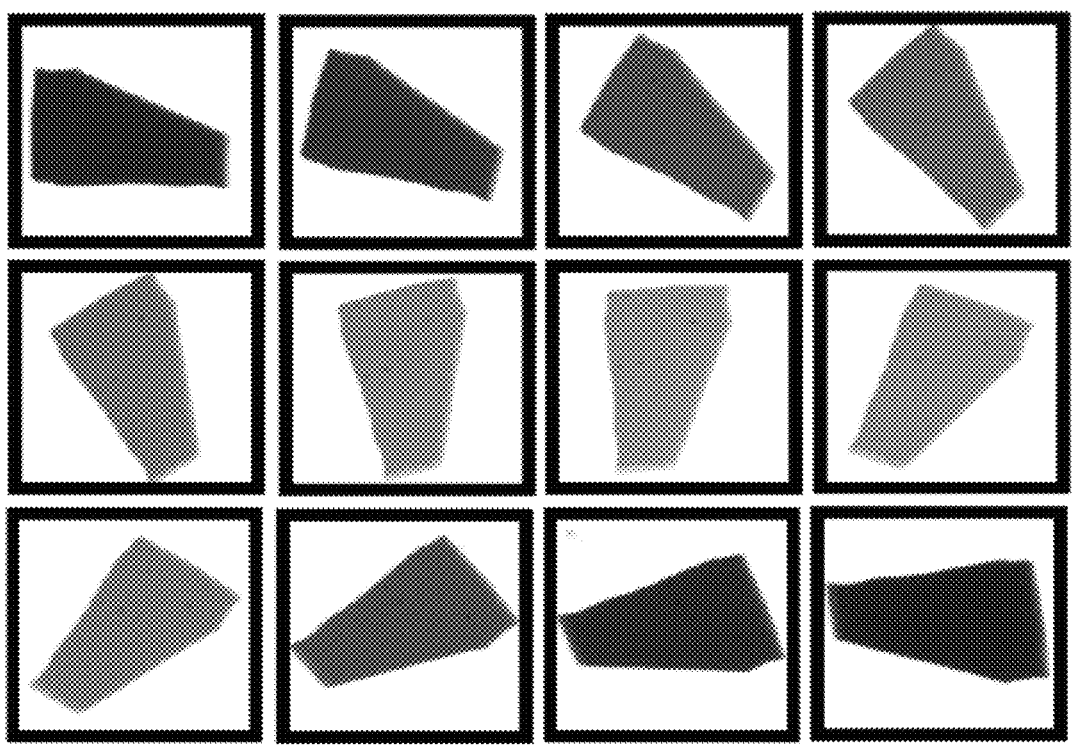
Figure 3G:
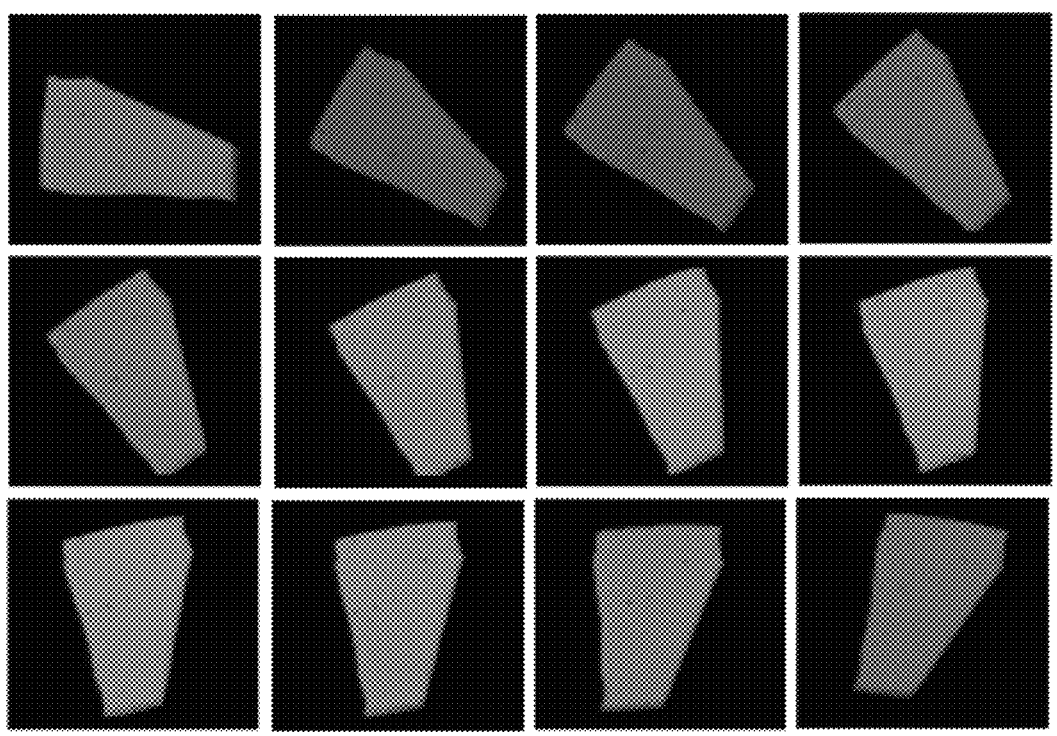

The unique assembly and optical properties arising from CT interactions are responsible for pleochroic behavior in these 2D materials. When placed in a petrographic microscope setup, shown in FIG. 3a, the color of a crystal changes with the polarization angle of incident light (FIG. 3b and FIG. 3c). Pleochroism is demonstrated in crossed stack materials when placed in a petrographic microscope without the analyzer (FIG. 3a). When rotated in free space, co-crystal 1α•7β exhibits orange, yellow, brown, purple, and pink hues (FIG. 3b). Co-crystal 1α•8β exhibits purple, pink, orange, and yellow in transmission (FIG. 3e). This transmitted light represents the components of plane-polarized light that is not absorbed by the crystal. When a second polarizer (analyzer) is inserted compound 1α•7β exhibits orange, brown, green, blue, purple, pink, and red in the parallel orientation (FIG. 3c) and purple, blue, green, yellow, orange, and pink in the cross orientation (FIG. 3d). Compound 1α•8β exhibits purple, red, orange, and brown in the parallel orientation (FIG. 3f) and orange, brown, green, turquoise, blue, purple, and pink in the cross orientation (FIG. 3g).

Figure 4B:
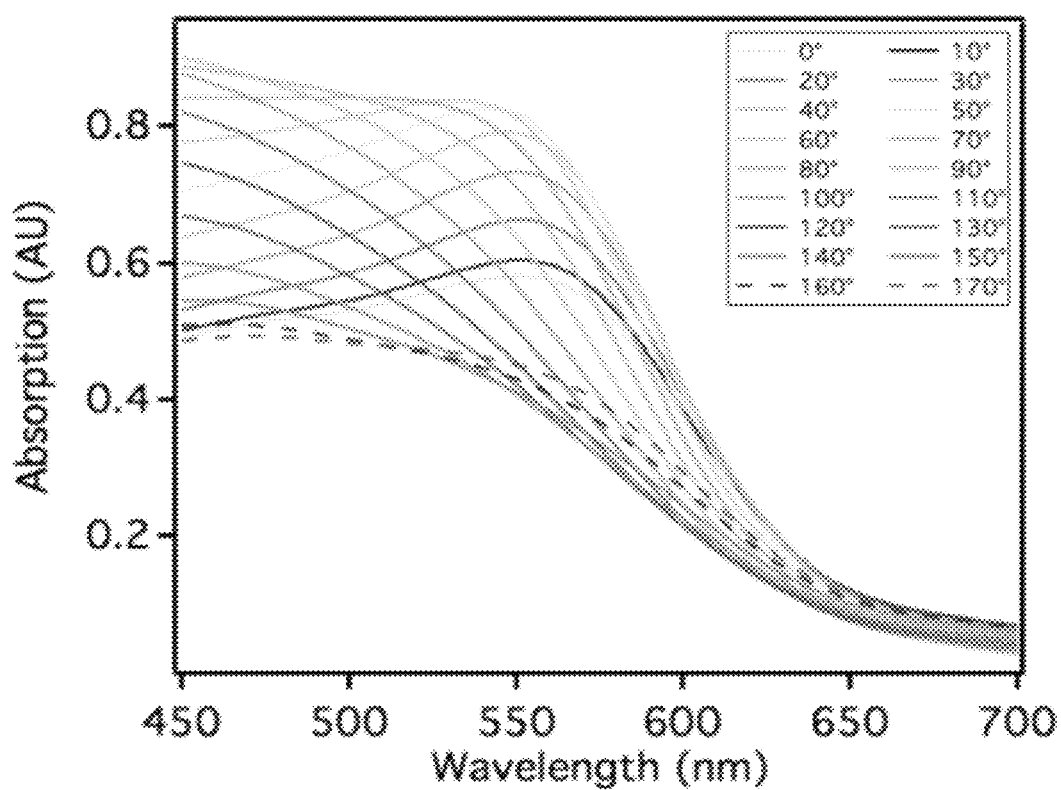
FIG. 4 is UV-Vis spectroscopy of pleochroic crystals; a), b) and c) single crystals of co-crystal $1\alpha\bullet7\beta$; and d), e) and f) co-crystal $1\alpha\bullet8\beta$, examined to elucidate absorption anisotropy; polarized UV-Vis spectroscopy of $1\alpha\bullet7\beta$ and $1\alpha\bullet8\beta$ shows two distinct absorption peaks associated with the intermolecular charge-transfer along the (1 0 0) and the electronic transitions in the secondary edge-to-face acceptor.
Figure 4C:
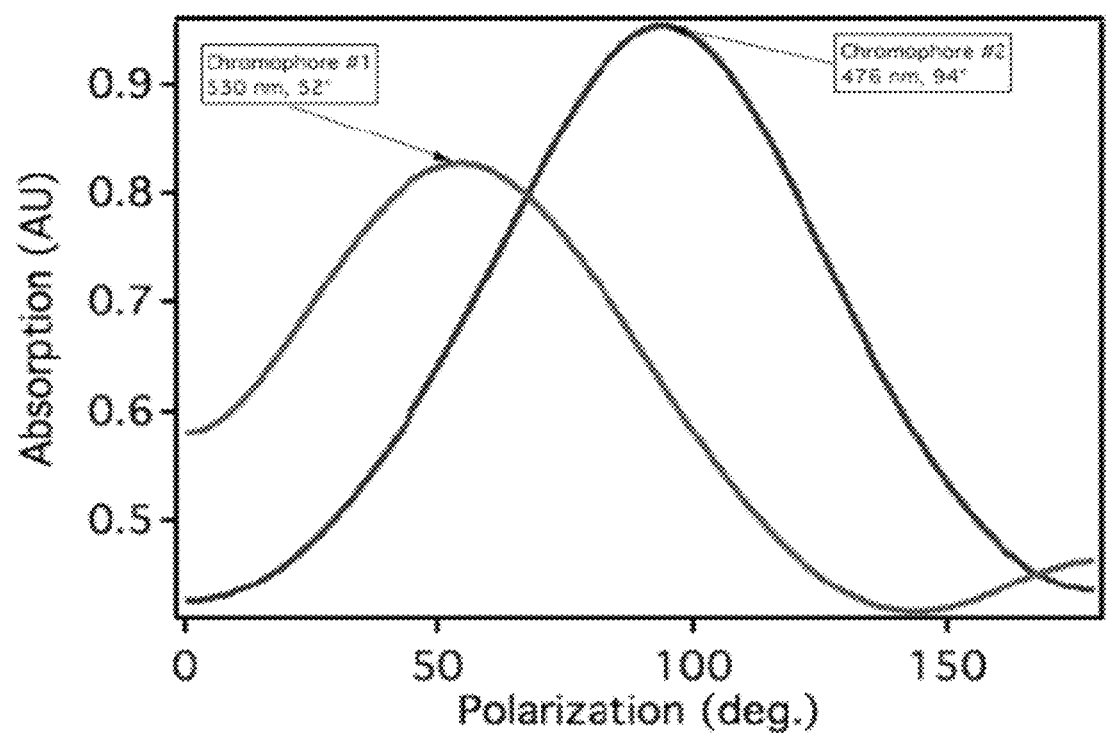
Figure 4D:
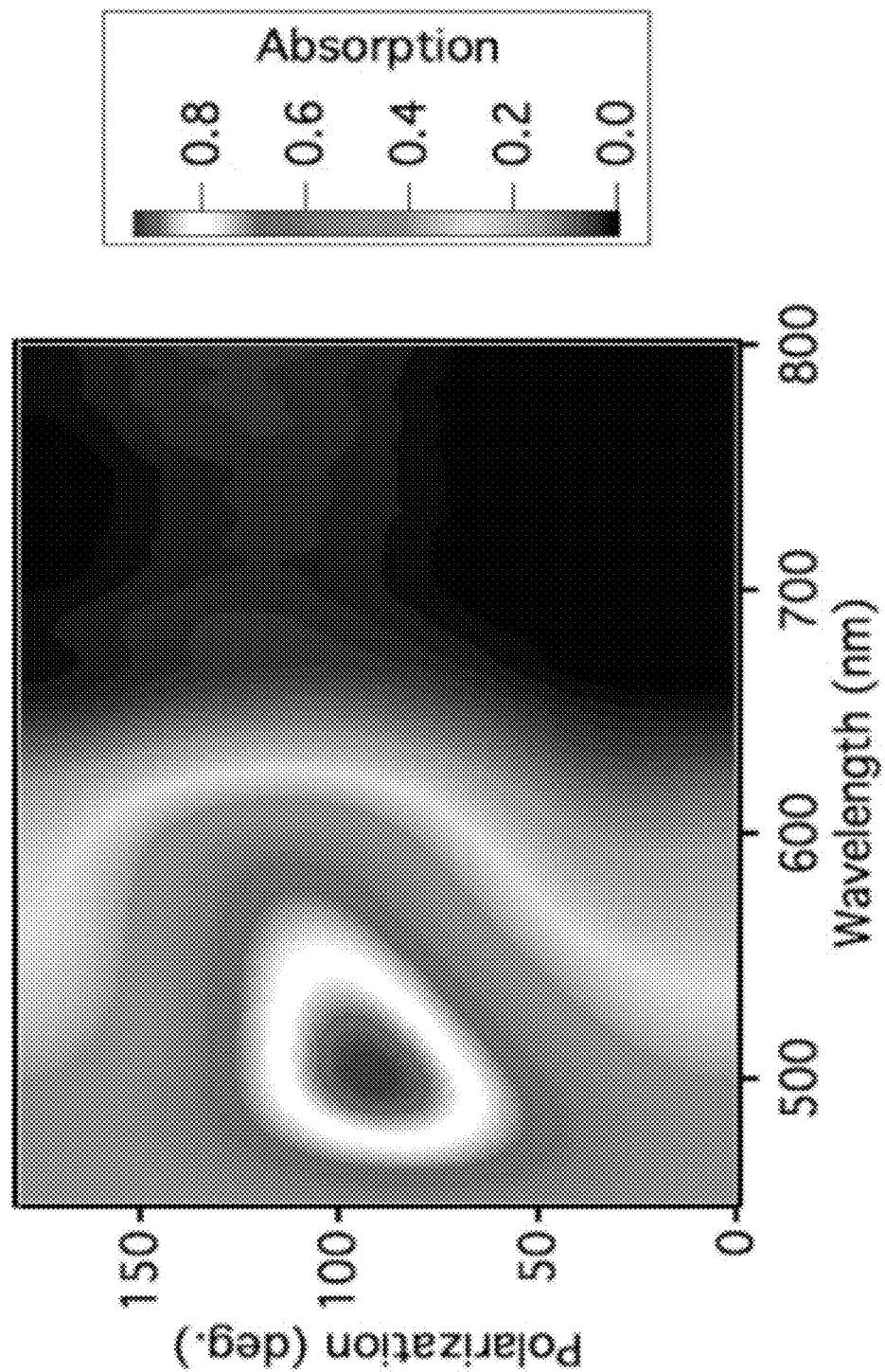
Figure 4E:
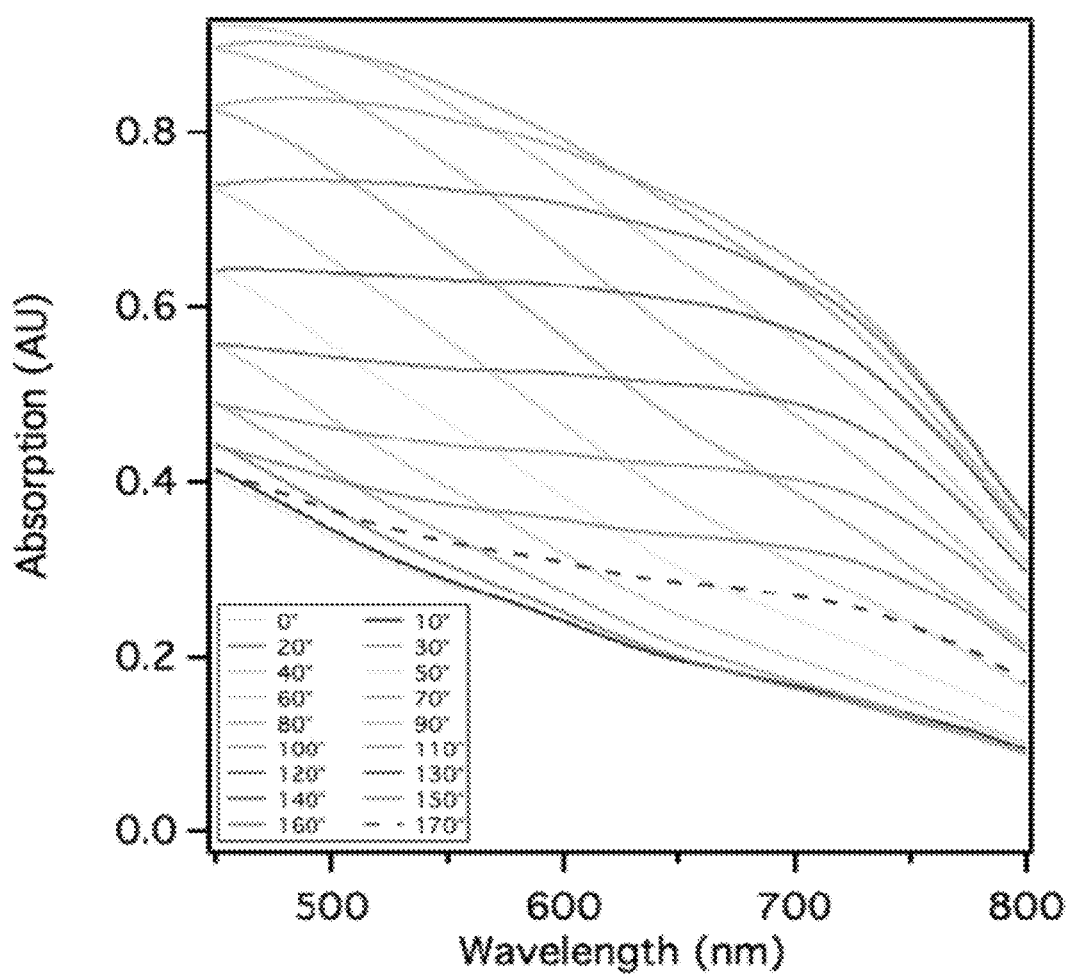
Figure 4F:
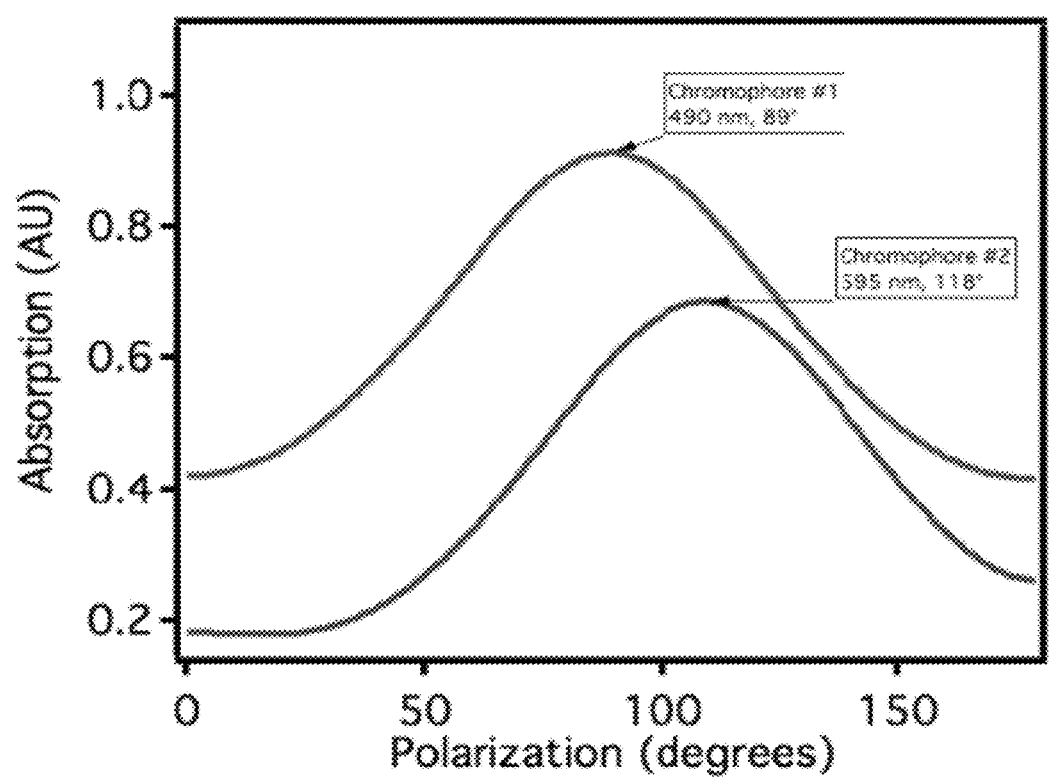

The absorption of both crystalline networks is highly anisotropic. Polarized UV-Vis spectroscopy is performed to determine the origin of absorption anisotropy in these crossed stack networks. In each co-crystal, two distinct chromophores (FIG. 4c and FIG. 4f), resulting from different electronic dipole moments, are observed. Crystal 1α•7β (FIG. 4a and FIG. 4b) preferentially absorbs light at approximately 53° and 95° with absorption maxima at 527 nm and 475 nm, respectively (FIG. 4c), while 1α•8β (FIG. 4d and FIG. 4e) at approximately 89° and 117° with absorption maxima at 490 nm and 595 nm, respectively (FIG. 4f). Though the UV-Vis data for co-crystal 1α•8β suggests only one chromophore, careful examination of the peak illustrates that the absorption maxima (wavelength) of the absorption changes with polarization angle, suggesting two overlapping chromophores.

The polarization angles for each chromophore can be linked to the molecular faces of each crossed stack network. By determining the unit cell of a specific crystal, indexing its faces, and performing polarized UV-Vis, the strongest absorption (at 95° in 1-3 and 89° in 2-3) is associated with the charge-transfer interaction between face-to-face donor-acceptor complexes along the (1 0 0). The second chromophore, 42° or 28° away, arises from the transition dipole along the face of the edge-to-face electron acceptor.

This non-parallel absorption is highly unexpected as most crystals with more than one absorption band typical have parallel or orthogonal absorption maxima consistent with the crystal eigendirections. However, crossed stack crystals are very thin, the retardance is first order, and the vibration directions are not manifest. Moreover, in the triclinic system the eigendirections are not fixed by any symmetry. Thickness of LASO crystals that exhibit pleochroic behavior range from 1-12 μm (SOM). To further verify the presence of two absorbers, the dichroic ratio is calculated at each absorption maxima for each crystal and is found to be significantly different (SOM). Given that mixed stack materials absorb strongly in the visible spectrum, the two absorptive axes in co-crystal 1α•7β and 1α•8β correspond to the mixed stack axis and optical transitions in the crossed stack acceptor.

The assembly that enables these electronic and optical phenomena results from the competition between π-π stacking, CT and hydrogen bonding. Compound 1α forms intermolecular H-bonds through two flexible glycol appendages (arms) and four carbonyl moieties, while the CT complements 7β and 8β rely on shorter amino and hydroxyl arms for binding to recognition sites. In the solid state, hydrogen bonding occurs between the glycol arms and the rigid arms of the donor (FIG. 1b and FIG. 1c), effectively stabilizing the crossed stack assembly. In conventional CT systems, the π-π stacking and CT would encourage faster growth along one dimension yielding a mixed stack or segregated stack morphology; however, the competition between hydrogen bonding and CT locks the structure into an unexpected architecture. The balanced noncovalent interactions, brought about by conformationally flexible glycol arms, result in closely packed, solvent-free, sheet-like co-crystals. The 2-D architecture of these materials is not a traditional mixed stack co-crystal, where van der Waals forces are responsible for holding the DA stacks together (Saito, G. et al., 2007 *Bulletin of the Chemical Society of Japan* 80, 1, incorporated herein by reference). Regarding the lattice structure, the material is a hybrid supramolecular architecture that incorporates a 3D hydrogen bonded network and two unique alternating CT stacks into a single lattice and is better classified as a network solid.

The disclosures of all articles and references, including patents, are incorporated herein by reference. The invention and the manner and process of making and using it are now described in such full, clear, concise and exact terms as to enable any person skilled in the art to which it pertains, to make and use the same. All references cited in this specification are incorporated herein by reference. It is to be understood that the foregoing describes preferred embodiments of the present invention and that modifications may be made therein without departing from the spirit or scope of the present invention.

What is claimed is:

1. An organic charge-transfer (CT) co-crystal in a crossed stack lattice exhibiting bidirectional CT interactions, where one donor molecule shares electrons with two different acceptors; wherein one acceptor is face-to-face with the donor and a second acceptor is edge-to-face with the donor, and wherein the co-crystal exhibits visible pleochroism with RGB and CMYK colors, said organic CT co-crystal selected from the group consisting of

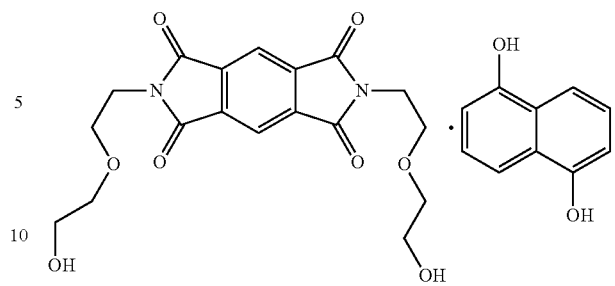

and

2. The organic CT co-crystal according to claim 1, wherein the acceptor is a diimide.

3. The organic CT co-crystal according to claim 1, wherein the ionicity of and are $\rho_{ms}$=0.53, $\rho_{xs}$=0.47, and $\rho_{ms}$=0.57, $\rho_{xs}$=0.42, respectively.

4. The organic CT co-crystal according to claim 1, wherein the co-crystal violates the mutual exclusion rule of IR and Raman modes along a mixed stack axes and a crossed stack axes.

5. The organic CT co-crystal according to claim 1, wherein absorption of light of the co-crystal is anisotropic.

6. The organic CT co-crystal according to claim 5, wherein two distinct chromophores are observed.

7. The organic CT co-crystal according to claim 6, wherein the two distinct chromophores absorb light at 53° and 95° with absorption maxima at 475 nm and 527 nm, respectively.

8. The organic CT co-crystal according to claim 6, wherein the two distinct chromophores absorb light at 89° and 117° with absorption maxima at 490 nm and 595 nm, respectively.

* * * * *